US012430558B2

(12) United States Patent
Dey et al.

(10) Patent No.: US 12,430,558 B2
(45) Date of Patent: Sep. 30, 2025

(54) COMBINING COMPRESSION, PARTITIONING AND QUANTIZATION OF DL MODELS FOR FITMENT IN HARDWARE PROCESSORS

(71) Applicant: Tata Consultancy Services Limited, Mumbai (IN)

(72) Inventors: Swarnava Dey, Kolkata (IN); Arpan Pal, Kolkata (IN); Gitesh Kulkarni, Bangalore (IN); Chirabrata Bhaumik, Kolkata (IN); Arijit Ukil, Kolkata (IN); Jayeeta Mondal, Kolkata (IN); Ishan Sahu, Kolkata (IN); Aakash Tyagi, Bangalore (IN); Amit Swain, Bangalore (IN); Arijit Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 1052 days.

(21) Appl. No.: 17/447,625

(22) Filed: Sep. 14, 2021

(65) Prior Publication Data

US 2022/0284293 A1    Sep. 8, 2022

(30) Foreign Application Priority Data

Jan. 29, 2021   (IN) .............................. 202121004213

(51) Int. Cl.
*G06N 3/082* (2023.01)
*G06F 1/3206* (2019.01)
(Continued)

(52) U.S. Cl.
CPC ........... *G06N 3/082* (2013.01); *G06F 1/3206* (2013.01); *G06F 18/2148* (2023.01); *G06N 3/063* (2013.01)

(58) Field of Classification Search
CPC ... G06F 1/3206; G06F 18/2148; G06N 3/063; G06N 3/082; G06N 3/088
See application file for complete search history.

(56) References Cited

U.S. PATENT DOCUMENTS

2022/0004858 A1\* 1/2022 Lee ..................... G06N 3/084

FOREIGN PATENT DOCUMENTS

CN          110298446 A      10/2019

OTHER PUBLICATIONS

Saguil et al., "A Layer-Partitioning Approach for Faster Execution of Neural Network-Based Embedded Applications in Edge Networks", Mar. 17, 2020, IEEE Access ( vol. 8), pp. 59456-59469. (Year: 2020).\*

(Continued)

*Primary Examiner* — Brent Johnston Hoover
(74) *Attorney, Agent, or Firm* — Finnegan, Henderson, Farabow, Garrett & Dunner, LLP

(57) ABSTRACT

Small and compact Deep Learning models are required for embedded AI in several domains. In many industrial use-cases, there are requirements to transform already trained models to ensemble embedded systems or re-train those for a given deployment scenario, with limited data for transfer learning. Moreover, the hardware platforms used in embedded application include FPGAs, AI hardware accelerators, System-on-Chips and on-premises computing elements (Fog/Network Edge). These are interconnected through heterogeneous bus/network with different capacities. Method of the present disclosure finds how to automatically partition a given DNN into ensemble devices, considering the effect of accuracy—latency power—tradeoff, due to intermediate compression and effect of quantization due to conversion to AI accelerator SDKs. Method of the present disclosure is an iterative approach to obtain a set of partitions by repeatedly (Continued)

refining the partitions and generating a cascaded model for inference and training on ensemble hardware.

7 Claims, 9 Drawing Sheets

(51) Int. Cl.
   *G06F 18/214* (2023.01)
   *G06N 3/063* (2023.01)

(56) References Cited

OTHER PUBLICATIONS

Saguil, Darren et al., "A Layer-Partitioning Approach for Faster Execution of Neural Network Based Embedded Applications in Edge Networks", IEEE Access, Mar. 2020, vol. 8, pp. 59456-59469, IEEE, https://ieeexplore.ieee.org/stamp/stamp.jsp?tp=&arnumber=9039657.

Campos De Oliveira, Fabiola Martins et al., "Partitioning Convolutional Neural Networks to Maximize the Inference Rate on Constrained IoT Devices", Future internet, Sep. 2019, vol. 11, Issue: 10, MDPI, https://www.mdpi.com/1999-5903/11/10/209/pdf.

Zhou, Li et al., "Adaptive Parallel Execution of Deep Neural Networks on Heterogeneous Edge Devices", ACM/IEEE Symposium on Edge Computing, Nov. 2019, pp. 195-208, MDPI, https://dl.acm.org/doi/pdf/10.1145/3318216.3363312.

Zhou, Li et al., "Distributing Deep Neural Networks with Containerized Partitions at the Edge", ACM/IEEE Symposium on Edge Computing, Jul. 2019, USENIX, https://www.usenix.org/system/files/hotedge19-paper-zhou.pdf.

Huang, Jin et al., "CLIO: Enabling automatic compilation of deep learning pipelines across IoT and Cloud", Annual International Conference on Mobile Computing and Networking, Apr. 2019, pp. 1-12, ACM, https://people.cs.umass.edu/~dganesan/papers/CLIO-Mobicom2020.pdf.

\* cited by examiner

COMBINING COMPRESSION, PARTITIONING AND QUANTIZATION OF DL MODELS FOR FITMENT IN HARDWARE PROCESSORS

PRIORITY CLAIM

This U.S. patent application claims priority under 35 U.S.C. § 119 to: India Application No. 202121004213, filed in India on Jan. 29, 2021. The entire contents of the aforementioned application are incorporated herein by reference.

TECHNICAL FIELD

The disclosure herein generally relates to deep learning models, and, more particularly, to application scenario-based compression, partitioning and quantization of deep learning (DL) models for acceleration of hardware processors and fitment of the DL models in the hardware processors.

BACKGROUND

Artificial Intelligence (AI) and Machine learning (ML) algorithms are steadily making inroads into embedded systems. Most of these models are targeted towards smartphones, consumer electronic devices, smart vehicles, providing advanced, personalized features. These devices often have dedicated hardware, dedicated product-lines, with phased design cycles, and belong to price categories that allow a case-to-case basis engineering of the software. Moreover, for smartphones, the application ecosystems allow additional functionalities powered by AI/ML algorithms.

Most of the low-end devices used in Industrial Internet of Things (IIoT), Robotics, Industry 4.0, Cyber-physical systems (CPS), etc. do not need ground-breaking features or a killer app. The main objectives for such deployments are image, video, and time-series analytics, with guaranteed accuracy, inference latency on a hardware configuration preferred by the customers. In addition, fast time to market is also very important in such settings. Unfortunately, not only does porting a DL model to new hardware requires niche skills, but also optimizing an already ported model on low-resource, ensemble embedded targets, poses several challenges. As an example, a large size of the model may prevent it from being loaded at run-time and cache memory at a time, making the inference slow. On the other hand, arbitrary reduction of the model size through quantization and compression may affect the representations learned by the model and affect the accuracy.

SUMMARY

Embodiments of the present disclosure present technological improvements as solutions to one or more of the above-mentioned technical problems recognized by the inventors in conventional systems. For example, in an aspect, there is provided a processor implemented method. The method comprises: obtaining a deep learning (DL) model specific to an application scenario and partitioning the DL model into a plurality of layers; partitioning, via the one or more hardware processors, the plurality of layers into k subsequences of layers based on k processing elements, wherein the k processing elements (PE) comprise a first processing element type; generating, for each layer of the DL model, a transforming layer based on a selection of one or more compression configurations and one or more quantization configurations, wherein each of the one or more compression configurations and the one or more quantization configurations comprise a corresponding inference accuracy, a corresponding inference latency, and a power consumption, and wherein the corresponding inference accuracy, the corresponding inference latency, and the inference power consumption are obtained by executing a cascaded DL model inference program; iteratively selecting at least one compression configuration and at least one quantization configuration for each transformed layer of the k subsequences of transformed layers, until each of the corresponding inference accuracy, the corresponding inference latency, and the inference power consumption reach a corresponding predefined threshold; iteratively performing the following: assigning a first subsequence of transformed layers from the k subsequences of transformed layers to a first processing element (PE) such that the first subsequences of transformed layers has a maximum inference accuracy, a minimum inference latency, and a minimum power consumption on the first processing element (PE); partitioning a second subsequence of transformed layers from the k subsequences of transformed layers into a first set of transformed layers and a second set of transformed layers and assigning the first set of transformed layers to the first PE and the second set of transformed layers to a second PE, such that each of the first set of transformed layers and the second set of transformed layers of the second subsequence of transformed layers has the maximum inference accuracy, the minimum inference latency, and the minimum power consumption on the first PE and the second PE respectively, wherein the step of iteratively assigning and partitioning are performed to obtain a mapping of the first subsequence of transformed layers and the second subsequence of layers on the first PE and the second PE; partitioning the second subsequence of layers of the DL model into two different partitions comprising of a set of layers, assigning each of the set of layers to the first PE and the second PE respectively, such that each of the first subsequences of transformed layers and the second subsequences of transformed layers has a maximum inference accuracy, a minimum inference latency, and a minimum power consumption on the first PE and the second (PE) respectively; continually partitioning subsequent subsequence of transformed layers into two partitions, each of the two partitions comprises a set of transformed layers, and assigning the set of transformed layers from the two partitions to an earlier processing element and to a current processing element respectively to obtain a mapping of k subsequences of transformed layers on the k processing elements, until each of the k subsequences of transformed layers has a maximum inference accuracy, a minimum inference latency and a minimum power consumption on the k processing elements (PE); generating a DL model based on the mapped k subsequences of transformed layers on the k processing elements; executing, via the cascaded DL model inference program, the DL model and determining an overall inference accuracy, an overall inference latency, and an overall inference power consumption; and rewarding or penalizing a sequence learning network based on a comparison of the overall inference accuracy, the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers.

In an embodiment, when (i) a $p^{th}$ processing element from the k processing elements is a second processing element type and (ii) the one or more compression configurations and the one or more quantization configurations are unavailable, the one or more compression configurations and the one or more quantization configurations are generated by: freezing and converting a $p^{th}$ subsequence of transformed layers from k subsequences of transformed layers for executing in a $p^{th}$ processing element serving as the second PE type; determining an inference accuracy, an inference latency and an inference power consumption for the $p^{th}$ subsequence of transformed layers on $p^{th}$ PE, at run-time based on (i) an intermediate output from a preceding subsequence of transformed layers and (ii) an intermediate output to a next subsequence of transformed layers; obtaining/generating the one or more quantization configurations and the one or more compression configurations based on the determined inference accuracy, the inference latency, and inference power consumption for the $p^{th}$ subsequence of transformed layers.

In an embodiment, when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by: freezing and converting a $p^{th}$ subsequence of transformed layers from k subsequences of transformed layers for executing in a $p^{th}$ processing element serving as the second PE type; re-training remaining transformed layers of the DL model without training the $p^{th}$ subsequence of transformed layers deployed on the $p^{th}$ processing element serving as the second PE type, wherein the remaining transformed layers of the DL model are retrained using an intermediate output of (i) a preceding subsequence of the $p^{th}$ subsequence of transformed layers and (ii) a next subsequence of the $p^{th}$ subsequence of transformed layers; determining a partition point between the $p^{th}$ subsequence of transformed layers and the next subsequence of transformed layers; and modifying an index of layers in the obtained mapping based on the determined partition point between the $p^{th}$ subsequence of transformed layers and the next subsequence of transformed layers.

In an embodiment, the first processing element type and the second processing element type are distinct from each other.

In another aspect, there is provided a system comprising: a memory storing instructions; one or more communication interfaces; and one or more hardware processors coupled to the memory via the one or more communication interfaces, wherein the one or more hardware processors are configured by the instructions to: obtain a deep learning (DL) model specific to an application scenario and partition the DL model into a plurality of layers; partition, via the one or more hardware processors, the plurality of layers into k subsequences of layers based on k processing elements, wherein the k processing elements (PE) comprise a first processing element type; generate, for each layer of the DL model, a transformed layer based on a selection of one or more compression configurations and one or more quantization configurations, each of the one or more compression configurations and the one or more quantization configurations comprise a corresponding inference accuracy, a corresponding inference latency, and an inference power consumption, wherein the corresponding inference accuracy, the corresponding inference latency, and the inference power consumption are obtained by executing a cascaded DL model inference program; iteratively select at least one compression configuration and at least one quantization configuration for each transformed layer of the k subsequences of transformed layers, until each of the corresponding inference accuracy, the corresponding inference latency, and the inference power consumption reach a corresponding predefined threshold by; iteratively performing: assigning a first subsequence of transformed layers from the k subsequences of transformed layers to a first processing element (PE) such that the first subsequences of transformed layers has a maximum inference accuracy and a minimum inference latency and a minimum power consumption on the first processing element (PE); partitioning a second subsequence of transformed layers from the k subsequences of layers into a first set of transformed layers and a second set of transformed layers and assigning the first set of transformed layers to the first PE and the second set of transformed layers to a second PE, such that each of the first subsequence of transformed layers and the second subsequences of transformed layers has the maximum inference accuracy, the minimum inference latency, and the minimum power consumption on the first PE and the second PE respectively, wherein the steps of iteratively assigning and partitioning are performed to obtain a mapping of the first subsequence of transformed layers and the second subsequence of transformed layers on the first PE and the second PE; partitioning the second subsequence of transformed layers of the DL model into two different partitions comprising of a set of transformed layers and assigning the corresponding set of transformed layers to the first PE and the second PE respectively, such that the second subsequences of transformed layers has a maximum inference accuracy, a minimum inference latency, and a minimum power consumption on the first PE and the second PE; continually partitioning subsequent subsequence of transformed layers into two partitions, each of the two partitions comprises a set of transformed layers, and assigning the set of transformed layers from each of the two partitions to an earlier processing element and the and a current processing element respectively to obtain a mapping of k subsequences of transformed layers on the k processing elements; generate a DL model based on the mapped k subsequences of transformed layers on the k processing elements; execute, via a cascaded DL model inference program, the DL model and determining an overall inference accuracy, an overall inference latency, and an overall inference power consumption; and reward or penalize a sequence learning network based on a comparison of the overall inference accuracy, the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers; and identify, the generated DL model as a final DL model based on the mapped k subsequences of transformed layers on the k processing elements for the application scenario.

In an embodiment, when (i) a $p^{th}$ processing element from the k processing elements is a second processing element type and (ii) the one or more compression configurations and the one or more quantization configurations are unavailable, the one or more compression configurations and the one or more quantization configurations are generated by: freeze and convert a $p^{th}$ subsequence of transformed layers from k subsequences of transformed layers for executing in a $p^{th}$ processing element serving as the second PE type; determine an inference accuracy, an inference latency and an inference power consumption for the $p^{th}$ subsequence of transformed layers on $p^{th}$ PE, at run-time based on (i) an intermediate output from a preceding subsequence of transformed layers and (ii) an intermediate output to a next subsequence of transformed layers; generate the one or more quantization configurations and the one or more compression configurations based on the determined inference accuracy, the inference latency, and inference power consumption for the $p^{th}$ subsequence of transformed layers.

In an embodiment, when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by: freeze and convert a $p^{th}$ subsequence of transformed layers from k subsequences of transformed layers for executing in a $p^{th}$ processing element serving as the second PE type; re-train remaining transformed layers of the DL model without training the $p^{th}$ subsequence of layers deployed on the $p^{th}$ processing element serving as the second PE type, wherein the remaining transformed layers of the DL model are retrained using an intermediate output of (i) a preceding subsequence of the $p^{th}$ subsequence of transformed layers and (ii) a next subsequence of the $p^{th}$ subsequence of transformed layers; determine a partition point between the $p^{th}$ subsequence of transformed layers and the next subsequence of transformed layers; and modify an index of layers in the obtained mapping based on the determined partition point between the $p^{th}$ subsequence of transformed layers and the next subsequence of transformed layers.

In an embodiment, the first processing element type and the second processing element type are distinct from each other.

In yet another aspect, there are provided one or more non-transitory machine readable information storage mediums comprising one or more instructions which when executed by one or more hardware processors causes obtaining a deep learning DL model specific to an application scenario and partitioning the DL model into a plurality of layers; partitioning, via the one or more hardware processors, the plurality of layers into k subsequences of layers based on k processing elements, wherein the k processing elements (PE) comprise a first processing element type; generating, for each layer of the DL model, a transformed layer based on a selection of one or more compression configurations and one or more quantization configurations, wherein each of the one or more compression configurations and the one or more quantization configurations comprise a corresponding inference accuracy, a corresponding inference latency, and a corresponding inference power consumption, wherein the corresponding inference accuracy, the corresponding inference latency, and the inference power consumption are obtained by executing a cascaded DL model inference program; iteratively selecting at least one compression configuration and at least one quantization configuration for each transformed layer of the k subsequences of transformed layers, until each of the corresponding inference accuracy, the corresponding inference latency, and the inference power consumption reach a corresponding predefined threshold by: iteratively performing: assigning a first subsequence of transformed layers from the k subsequences of transformed layers to a first processing element (PE) such that the first subsequence of transformed layers has a maximum inference accuracy and a minimum inference latency and a minimum power consumption on the first processing element (PE); partitioning a second subsequence of transformed layers from the k subsequences of transformed layers into a first set of transformed layers and a second set of transformed layers and assigning the first set of transformed layers to the first PE and the second set of transformed layers to a second PE, such that each of the first subsequence of transformed layers and the second subsequence of transformed layers has the maximum inference accuracy, the minimum inference latency and the minimum power consumption on the first PE and the second PE respectively, wherein the steps of iteratively assigning and partitioning are performed to obtain a mapping of the first subsequence of transformed layers and the second subsequence of layers on the first PE and the second PE; partitioning the second subsequence of transformed layers of the DL model into two different partitions comprising of a set of layers, assigning the corresponding set of layers from each of the two different partitions to the first PE and the second PE respectively, such that each of the first subsequence of transformed layers (and/or the corresponding set of layers from one partition) and the second subsequence of transformed layers (and/or the corresponding set of layers from another partition) has a maximum inference accuracy, a minimum inference latency and a minimum power consumption on the first PE and the second PE; continually partitioning subsequent subsequence of layers into two partitions, each of the two partitions comprises a set of layers, and assigning a first set of layers from the set of layers to an earlier processing element and a second set of layers from the set of layers to a current processing element to obtain a mapping of k subsequences of layers on the k processing elements; generating a DL model based on the mapped k subsequences of layers on the k processing elements; executing, via a cascaded DL model inference program, the DL model and determining an overall inference accuracy, an overall inference latency, and an overall inference power consumption; and rewarding or penalizing a sequence learning network based on a comparison of the overall inference accuracy, the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers.

In an embodiment, when (i) a $p^{th}$ processing element from the k processing elements is a second processing element type and (ii) the one or more compression configurations and the one or more quantization configurations are unavailable, the one or more compression configurations and the one or more quantization configurations are generated by: freezing and converting a $p^{th}$ subsequence of transformed layers from k subsequences of transformed layers for executing in a $p^{th}$ processing element serving as the second PE type; determining an inference accuracy, an inference latency and an inference power consumption for the $p^{th}$ subsequence of transformed layers on $p^{th}$ PE, at run-time based on (i) an intermediate output from a preceding subsequence of transformed layers (with reference to $p^{th}$ subsequence of transformed layers) and (ii) an intermediate output to a next subsequence of transformed layers; obtaining/generating the one or more quantization configurations and the one or more compression configurations based on the determined inference accuracy, the inference latency, and inference power consumption for the $p^{th}$ subsequence of transformed layers.

In an embodiment, when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by: freezing and converting a $p^{th}$ subsequence of transformed layers from k subsequences of transformed layers for executing in a $p^{th}$ processing element serving as the second PE type; re-training remaining transformed layers of the DL model without training the $p^{th}$ subsequence of transformed layers deployed on the $p^{th}$ processing element serving as the second PE type, wherein the remaining transformed layers of the DL model are retrained using an intermediate output of (i) a preceding subsequence of the $p^{th}$ subsequence of transformed layers and (ii) a next subsequence of the $p^{th}$ subsequence of transformed layers; determining a partition point between the $p^{th}$ subsequence of transformed layers and the next subsequence of transformed layers; and modifying an index of layers in the obtained mapping based on the determined partition point between the $p^{th}$ subsequence of transformed layers and the next subsequence of transformed layers.

In an embodiment, the first processing element type and the second processing element type are distinct from each other.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
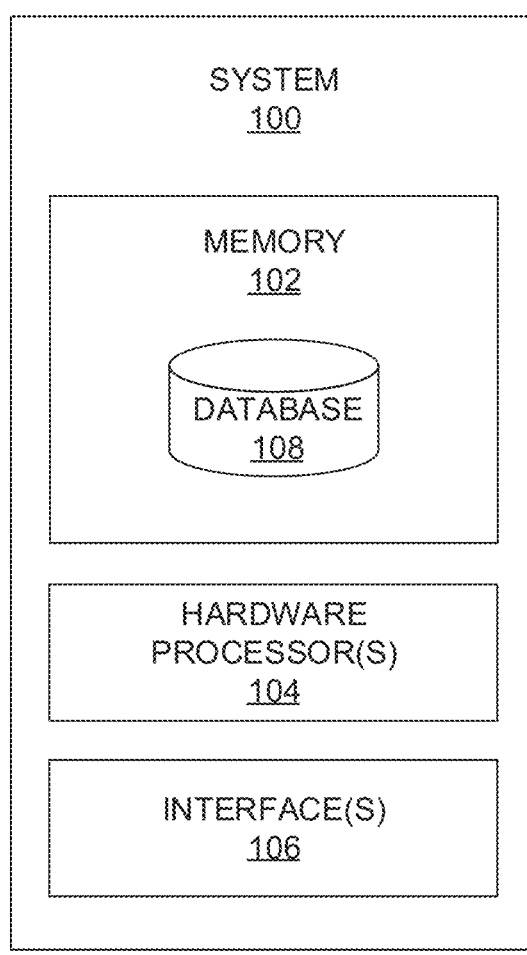
FIG. 1 depicts a system for application scenario-based combining compression, partitioning and quantization of deep learning (DL) models for fitment of the DL models in the hardware processors, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Artificial Intelligence (AI) and Machine learning (ML) algorithms are steadily making inroads into embedded systems. Most of these models are targeted towards smartphones, consumer electronic devices, smart vehicles, providing advanced, personalized features. These devices often have dedicated hardware, dedicated product-lines, with phased design cycles, and belong to price categories that allow a case-to-case basis engineering of the software. Moreover, for smartphones, the application ecosystems allow additional functionalities powered by AI/ML algorithms.

Most of the low-end devices used in Industrial Internet of Things (IIoT), Robotics, Industry 4.0, Cyber-physical systems (CPS), etc. do not need ground-breaking features or a killer app. The main objectives for such deployments are image, video, and time-series analytics, with guaranteed accuracy, inference latency on a hardware configuration preferred by the customers. In addition, fast time to market is also very important in such settings. Unfortunately, not only does porting a DL model to new hardware requires niche skills, but also optimizing an already ported model on low-resource, ensemble embedded targets, poses several challenges. As an example, a large size of the model may prevent it from being loaded at run-time and cache memory at a time, making the inference slow. On the other hand, arbitrary reduction of the model size through quantization and compression may affect the representations learned by the model and affect the accuracy.

Several prior research works attempted to transform DL models to resource-constrained systems. In another research work, a route through the model architecture was dynamically composed of different network operations to make a series of decisions using reinforcement learning. However, it requires training data to re-design the model.

In the last few years, several efforts have been made to automate the design of complex DL architectures under the umbrella research theme of AutoML (as known in the art research work). It is also shown that the existing approaches for transforming DL models to an embedded system, e.g., compression, can also be applied more effectively using autoML. Most of these methods limit their approach to specific application. For instance, these techniques cannot be mapped as is to a CPS context primarily due to two reasons. Firstly, the target hardware configurations are less powerful in terms of processor, memory, and battery compared to smartphones. These are just sufficient for sensing, control, and actuation in legacy customer setups, and it is not always feasible to completely change the hardware for accommodating a new ML/DL algorithm as a part of the control loop. It is always better to choose deployment hardware based on DL workload. However, dependence on many different stakeholders, mandatory testing cycles, and tight schedules make it difficult to completely replace an existing hardware setup. Rather, commercial off-the-shelf (COTS) hardware artificial intelligence (AI) accelerators of suitable form factor and computation offloading to network edge, are often used. Given this complex hardware setup, it is not straight forward to model the latency required for building/transforming a DL model using the current AutoML variants.

Second, majority of the automated neural network search methods assume the availability of original training data for optimizing the model at every step. Augmentation to existing hardware with accelerators and optimization of existing tested models on such augmented platform is preferred over completely re-training and replacement of an existing model. Embodiments of the present disclosure consider the unique characteristics of the low resource, ensemble embedded hardware, and use a combination of different transformations e.g., compression, hardware acceleration, partitioning to optimize existing DL models for enabling AutoML approaches to work better for the CPS context.

Embodiments of the present disclosure address two issues and present an approach to automate DL model transformation, primarily targeting the CPS hardware. More specifically, systems and methods of the present disclosure (i) apply several techniques in unison to transform a model with a control on the accuracy loss (including no accuracy loss), when there is no re-training possible, (ii) perform a quantization aware retraining (QAR) for COTS accelerators, and (iii) model the typical hardware setup in CPS in an optimization framework.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 depicts a system 100 for application scenario-based combining compression, partitioning and quantization of deep learning (DL) models for fitment of the DL models in the hardware processors, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises details on input received such as DL model(s) corresponding to one or more applications scenarios (e.g., cyber physical systems, Internet of Robotics Things, Industry 4.0, smart cities and environment and the like), compression configurations, quantization configurations, and the like.

The information stored in the database 108 further comprises details on various performance parameters, for example, but are not limited to accuracy, latency, and power consumption by one or more DL models being executed, and the like. The database 108 further comprises one or more pre-defined thresholds such as but are not limited to accuracy threshold, latency threshold, power consumption threshold, and the like. The memory 102 may store various as known in the art techniques (e.g., partitioning technique, compression techniques and the like) which are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
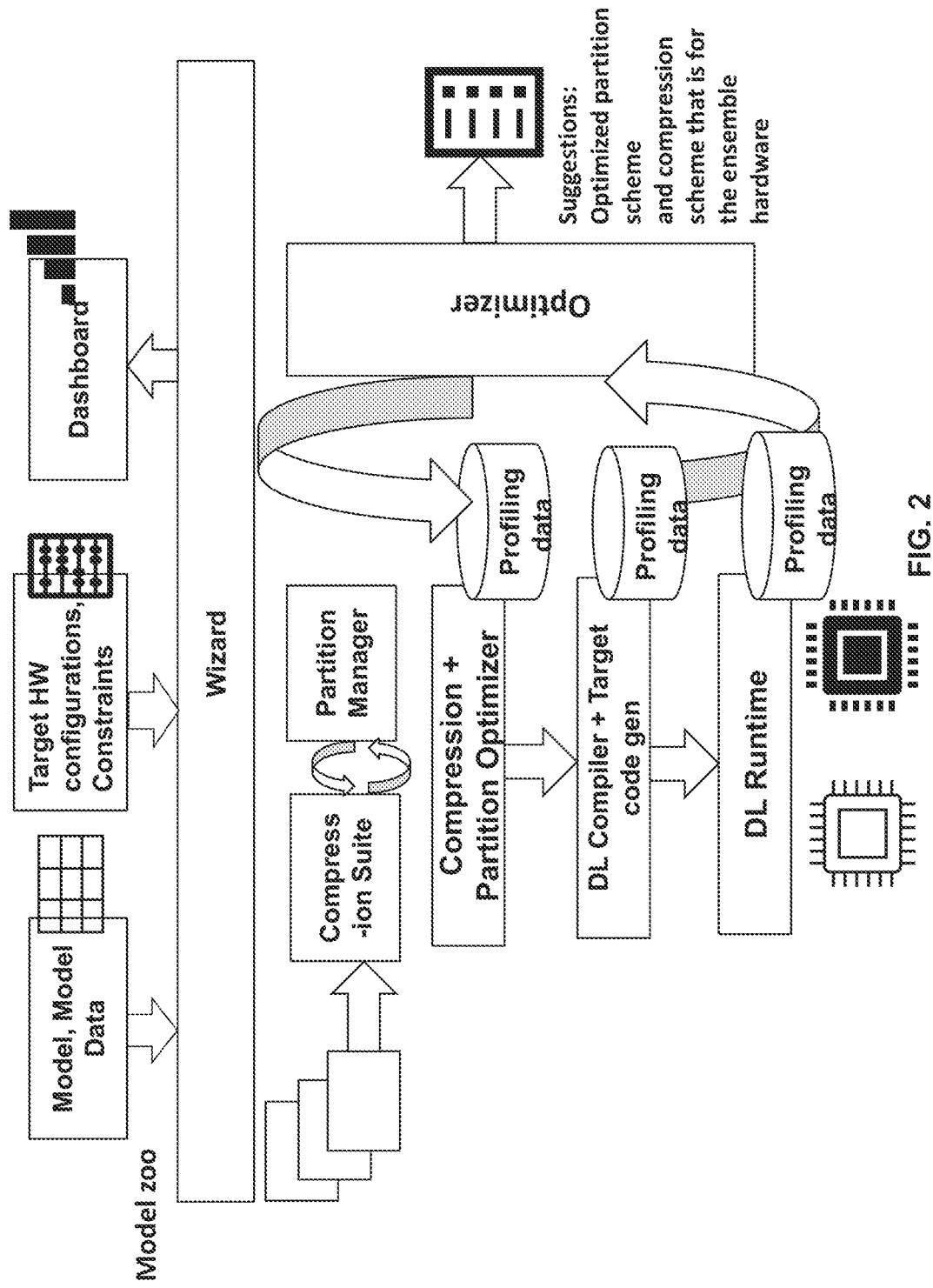
FIG. 2 depicts an exemplary architecture of the system illustrating an implementation of partitioning and compression technique(s) being performed on one or more DL models comprised therein, in accordance with an embodiment of the present disclosure.

FIG. 2, with reference to FIG. 1, depicts an exemplary architecture of the system 100 illustrating an implementation of partitioning and compression technique(s) being performed on one or more DL models comprised therein, in accordance with an embodiment of the present disclosure.

Figure 3:
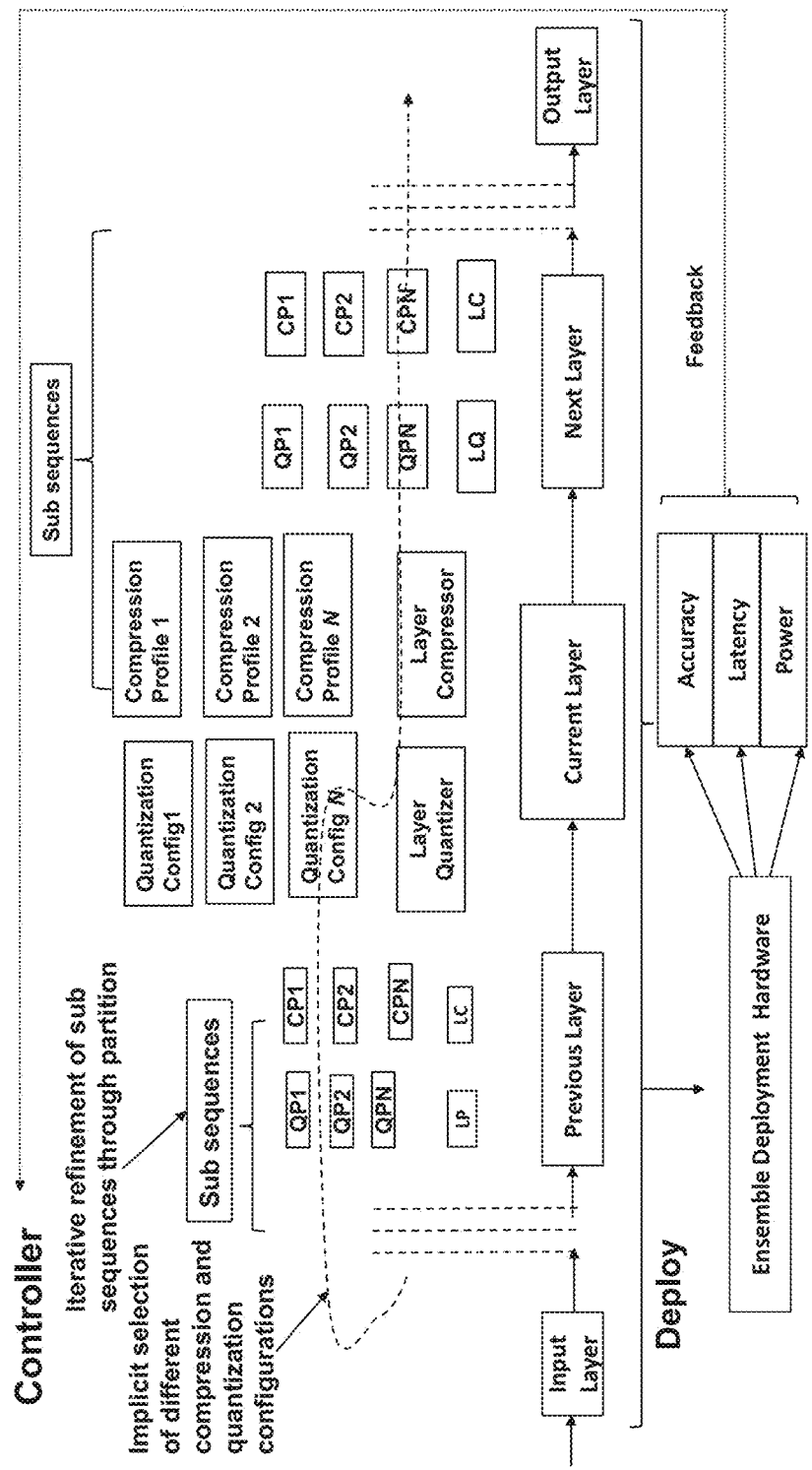
FIG. 3 depicts an exemplary architecture of the system illustrating an implementation of a neural network configuration search for pre-trained models specific to an application scenario, in accordance with an embodiment of the present disclosure.

FIG. 3, with reference to FIGS. 1 through 2, depicts an exemplary architecture of the system 100 illustrating an implementation of a neural network configuration search for pre-trained models specific to an application scenario, in accordance with an embodiment of the present disclosure. More specifically, FIG. 3, depicts the neural network configuration search for pre-trained models specific in a cyber physical system, in accordance with an embodiment of the present disclosure.

Figure 4A:
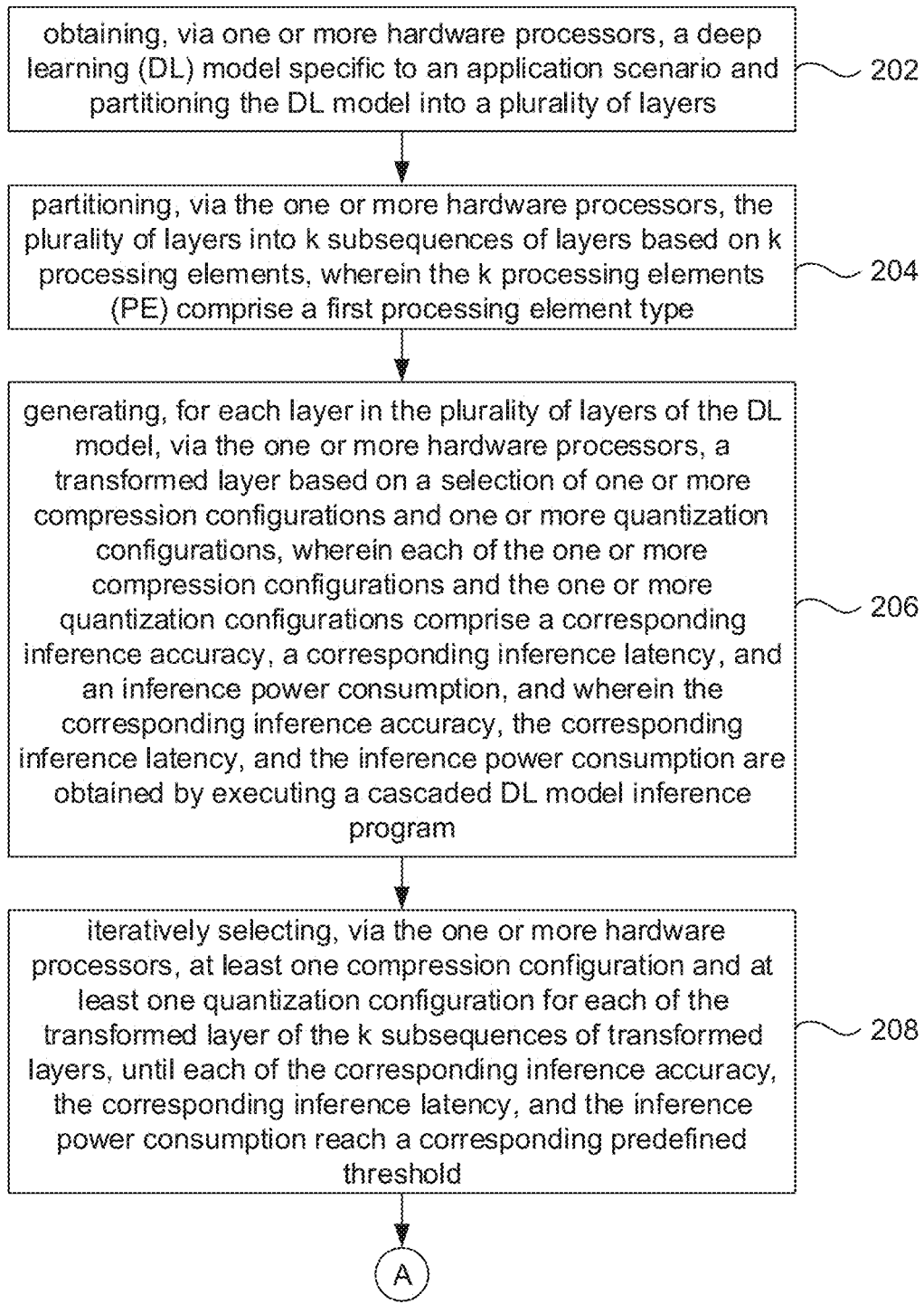
FIGS. 4A through 4C depicts an exemplary flow chart illustrating a method that implements an application scenario-based combining compression, partitioning and quantization of deep learning (DL) models for fitment of the DL models in the hardware processors, using the systems of FIGS. 1 through 3, in accordance with an embodiment of the present disclosure.
Figure 4B:
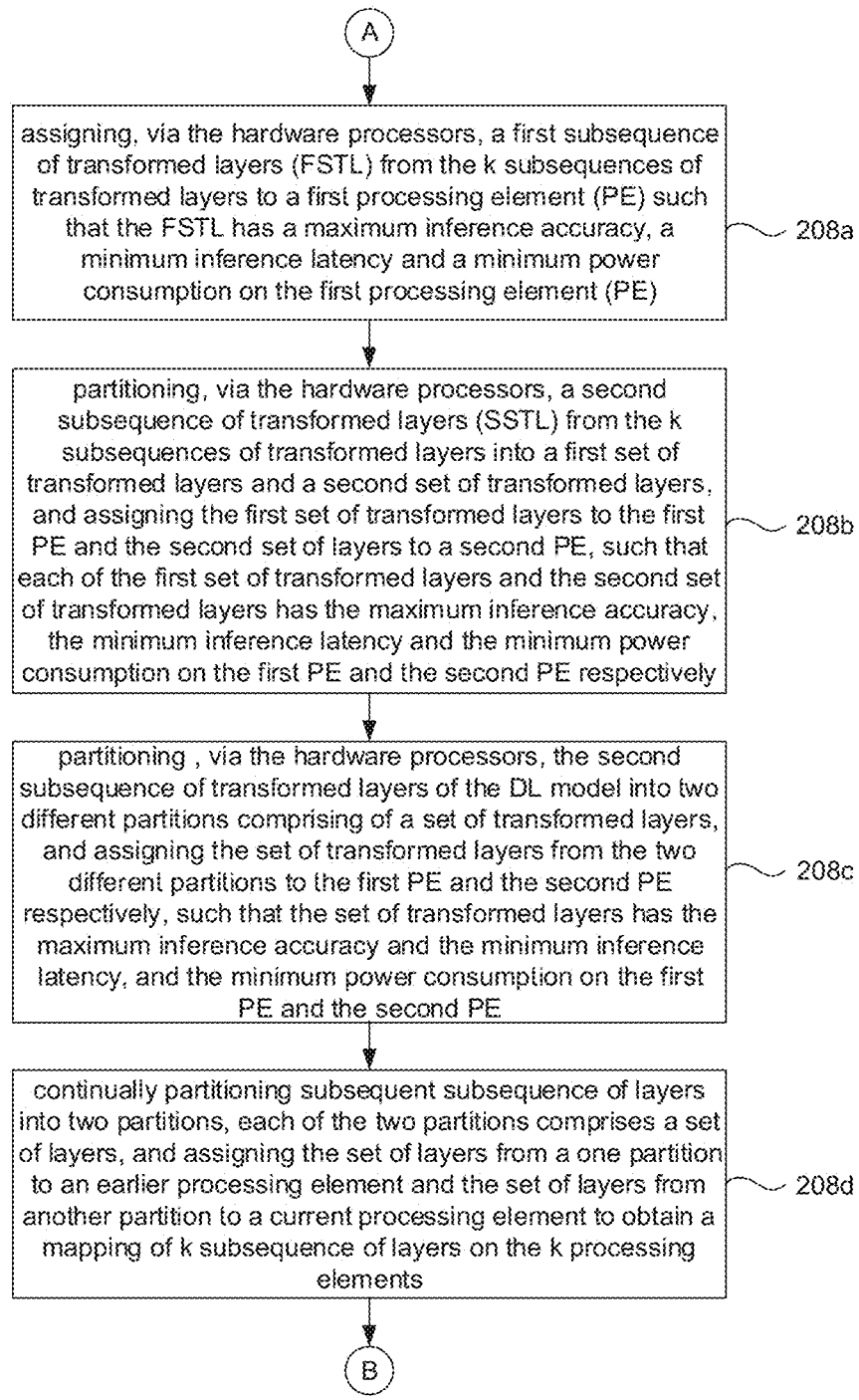
Figure 4C:
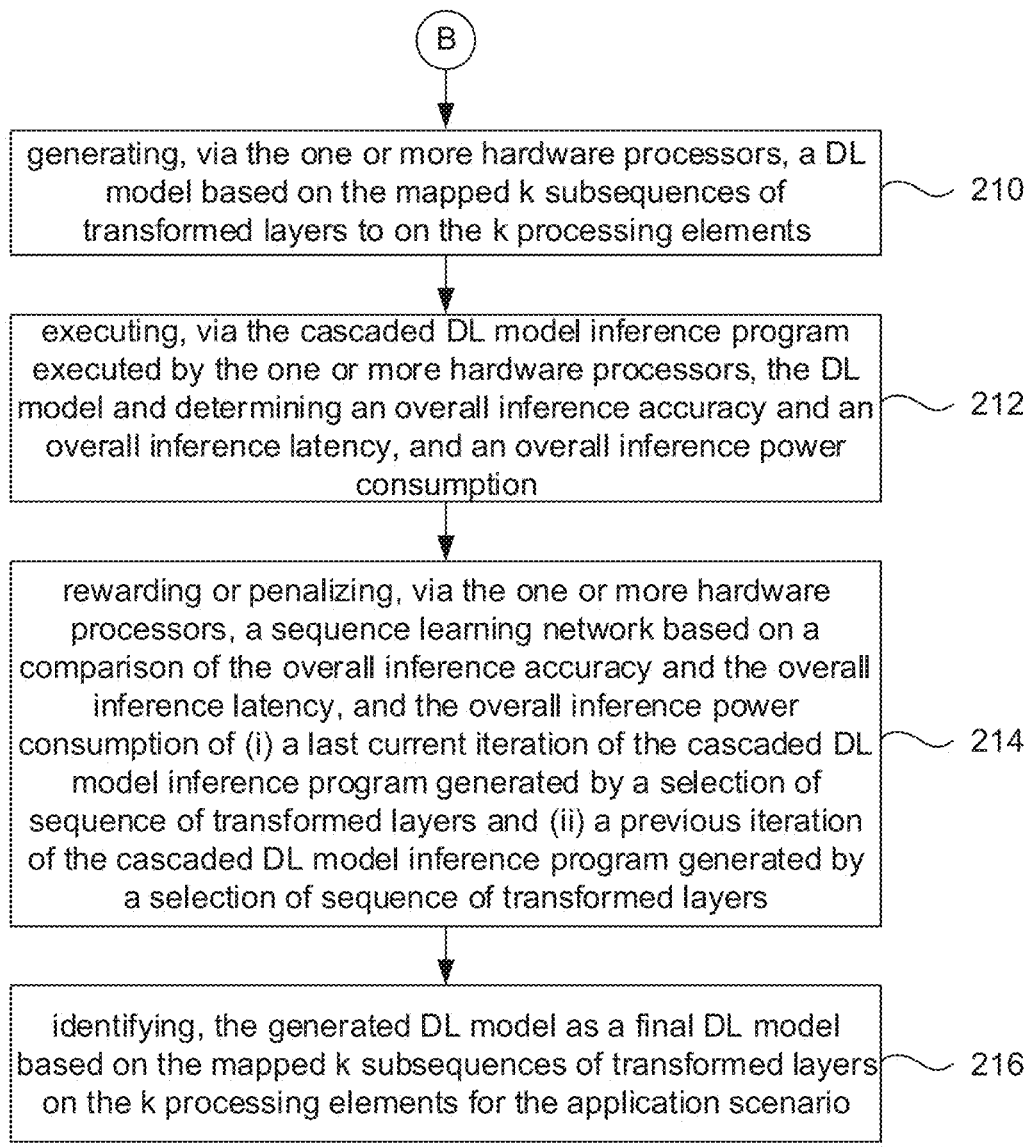

FIGS. 4A through 4C, with reference to FIG. 1 through 3, depicts an exemplary flow chart illustrating a method that implements an application scenario-based combining compression, partitioning and quantization of deep learning (DL) models for fitment of the DL models in the hardware processors, using the systems of FIGS. 1 through 3, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 obtain a deep learning (DL) model specific to an application scenario and split the DL model into a plurality of layers (e.g., say a plurality of n layers).

At step 204 of the present disclosure, the one or more hardware processors 104 partition the plurality of layers into k subsequences of layers based on k processing elements. In an embodiment, the k processing elements (PE) comprise a first processing element type (e.g., embedded systems such as NVIDIA® Jetson Nano board, Neural Compute Stick (NCS), and the like).

At step 206 of the present disclosure, the one or more hardware processors 104 generate, for each layer of the DL model, a transformed layer based on a selection of one or more compression configurations and one or more quantization configurations. Each of the one or more compression configurations and the one or more quantization configurations comprise a corresponding inference accuracy, a corresponding inference latency, and a corresponding inference power consumption. In an embodiment, the corresponding inference accuracy, the corresponding inference latency, and the corresponding inference power consumption are obtained/generated by executing a cascaded DL model inference program (wherein the cascaded DL inference program is comprised in the system 100 or in an external system connected to the system 100 via I/O interface(s)). The one or more compression configurations and the one or more quantization configurations are either pre-defined or dynamically generated by respective compression and quantization units (comprised in the system 100). The respective compression and quantization units are shown in FIG. 3, in one embodiment of the present disclosure. The one or more compression configurations and one or more quantization configurations are generated based on two scenarios. For example, the first scenario includes a processing element (PE) serving as the first processing element type and the second scenario includes a processing element (PE) serving as a second processing element type. In one embodiment, the first PE type and the second PE type are distinct from each other. More specifically, if the first processing element type includes processing element(s) such as embedded systems comprising one or more of NVIDIA® Jetson Nano board(s), Neural Compute Stick, and the like then the second processing element type include processing element(s) such as commercial off-the-shelf (COTS) Artificial Intelligence (AI) accelerators (or Artificial Intelligence based hardware accelerators), one or more field-programmable gate arrays (FPGAs), and the like. It is to be understood by a person having ordinary skill in the art or a person skilled in the art that the above examples of the first PE type and the second PE type shall not be construed as limiting the scope of the present disclosure.

In an embodiment, when (i) a $p^{th}$ processing element from the k processing elements is a second processing element type and (ii) the one or more compression configurations and the one or more quantization configurations are unavailable, a $p^{th}$ subsequence of transformed layers from k subsequences of transformed layers is frozen and converted for executing in the $p^{th}$ processing element serving as the second PE type. Upon executing in the $p^{th}$ processing element, an inference accuracy, an inference latency, and an inference power consumption for the $p^{th}$ subsequence of transformed layers on the $p^{th}$ PE is determined at run-time based on (i) an intermediate output from a preceding subsequence of transformed layers (e.g., say intermediate output from nth subsequence of transformed layers) and (ii) an intermediate output to a next subsequence of transformed layers (e.g., say intermediate output from $q^{th}$ subsequence of transformed layers). The one or more quantization configurations and the one or more compression configurations are generated/obtained based on the determined inference accuracy, the inference latency, and inference power consumption for the $p^{th}$ subsequence of transformed layers. The above steps can be better understood by way of an illustrative pseudo code below:

Algorithm 1/pseudo code: Generation of compression and partitioning configurations

```
Result: Set of partition configurations
  1. i, start ← first layer;
  2. end ← last layer;
  3. while i ≤ end do
  4.   Freeze+convert layers 0 to i for HW Accelerator;
  5.   ACC, LAT ← run inference on combined model;
  6.   solution_set_i ← {ACC, LAT};
  7.   i=i+1
  8. end
```

At step 208 of the present disclosure, the one or more hardware processors 104 iteratively select at least one compression configuration and at least one quantization configuration for each transformed layer of the k subsequences of transformed layers, until each of the corresponding inference accuracy, the corresponding inference latency, and the inference power consumption reaches a corresponding predefined threshold. The corresponding predefined threshold is provided along with the DL model as an input and is executed as is without partitioning, compression, and quantization. In other words, the predefined thresholds (e.g., accuracy threshold, latency threshold, and power consumption threshold) are available to the system 100 when the DL model is obtained as an input for further processing. The above step of iterative selection of the at least one compression configuration and at least one quantization configuration for each transformed layer comprises iteratively performing the following steps, until each of the k subsequences of transformed layers has a maximum inference accuracy, a minimum inference latency and a minimum power consumption on the k processing elements (PE). The iterative steps include: assigning (208a) a first subsequence of transformed layers from the k subsequences of transformed layers to a first processing element (PE) such that the first subsequence of transformed layers has a maximum inference accuracy and a minimum inference latency and a minimum power consumption on the first processing element (PE); partitioning (208b) a second subsequence of transformed layers from the k subsequences of transformed layers into a first set of transformed layers and a second set of transformed layers and assigning the first set of transformed layers to the first PE and the second set of transformed layers to a second PE, such that each of the first subsequence of transformed layers and the second subsequences of transformed layers has the maximum inference accuracy, the minimum inference latency and the minimum power consumption on the first PE and the second PE, wherein the step of iteratively assigning and partitioning are performed to obtain a mapping of two subsequence of transformed layers (e.g., (i) the first subsequence of transformed layers and/or the first set of transformed layers and (ii) the second subsequence of transformed layers and/or the second set of transformed layers) on the two processing elements (e.g., the first processing element and the second processing element); partitioning (208c) the second subsequence of layers of the DL model into two different partitions, each partition comprising of a set of layers, and assigning the corresponding set of layers to the first PE and the second PE respectively, such that each of the first subsequence of transformed layers and the second subsequence of transformed layers has a maximum inference accuracy, a minimum inference latency and a minimum power consumption on the first PE and the second PE respectively; continually partitioning (208d) subsequent subsequence(s) of transformed layers into two partitions, each of the two partitions comprises a set of transformed layers and assigning the set of transformed layers from the corresponding partitions to an earlier processing element and to a current processing element respectively to obtain a mapping of k subsequences of transformed layers on the k processing elements. The steps of 208a through 208d are better understood by way of the following description:

Compression/quantization helps in achieving the desired inference latency (IL) but the inference accuracy (IA) may drop. With the availability of several COTS neural network accelerators and rapid developments of Edge computing technologies, this can be addressed with minimum change to the existing setup. Let PART(m) be the transform that generates a set of n partitioned models $m_1, m_2, \ldots, m_n$ which can perform the desired inference in a cascaded manner, such that $m_1$ is fed the input, each of the subsequent partitioned models operate on the intermediate data and $m_n$ produces the final output. In this scheme there is no loss of accuracy and an upper bound on the IL is given by: $\Sigma_{i=1}^{n} LAT(m_i)$. Model partitioning for accelerating IL is addressed earlier in the context of computation offloading between a host and a network or bus connected hardware, providing low latency and privacy preservation.

For a generalized partitioning of a DL model between more than two resources, a DL model graph L and a set of n layers are considered, where layer $l_i \in L$, a set P of m bus or network connected processing elements (PE), such that $p_k \in P$. Let $T_{i,j}^k$ be the computation latency for processing a subsequence of layers i through j in a PE k and $D_j$ be the data transfer latency for sending the output of layer j to PE k+1. The goal is to partition n layers into k subsequences of layers, assign each partition to a processing element in P. The overall inference is achieved when all these subsequences are processed, without changing the functionality and accuracy of the model. To minimize the overall IL, the optimal assignment needs to be determined that minimizes the execution latency for the subsequence $(l_i, \ldots l_{i,j})$, for which the sum of execution latency and data transfer latency for layer j is maximum. Using a brute force approach, this can be achieved by trying out all possible subsequence combinations on all possible elements in P, resulting in a combinatorial explosion. Embodiments of the present disclosure implement a dynamic programming (DP) approach to solve this assignment problem. An optimal assignment of I layers on p processors is denoted as $O_l^p$ and it is defined recursively as follows:

1. Base case: when subsequence $(l_i, \ldots, l_j)$ to be assigned to a single processor is given as:

$$O_j^1 = T_{1,j}^1 \quad (1)$$

2. Recursive step: The optimal assignment of on $(l_i, \ldots, l_j)$ on $(p_1, \ldots, p_k)$ requires the optimal assignment of $(l_i, \ldots, l_{i-1})$ on $(p_1, \ldots, p_{k-1})$ and then the assignment of $(l_i, \ldots l_j)$ on $p_k$:

$$O_j^k = \min_{i=1,2,\ldots,j-1} \max(O_{i-1}^{k-1}, T_{i,j}^k + D_j) \quad (2)$$

To solve the problem with a DP approach, a depiction of cost matrix similar to below Table 1 needs to be built with the optimal assignment costs in a bottom-up fashion.

TABLE 1

Cost matrix indicative of mapping of k subsequences layers on k processing elements

| | $P_1$ | $P_2$ | ... | $P_m$ |
|---|---|---|---|---|
| $l_1$ | $O_1^1$ | $O_1^2$ | ... | $O_1^m$ |
| $l_2$ | $O_2^1$ | $O_2^2$ | ... | $O_2^m$ |
| ... | ... | ... | ... | ... |
| $l_n$ | $O_n^1$ | $O_n^2$ | ... | $O_n^m$ |

In the above cost matrix, rows→layers, columns→processors and cells→optimal cost of l layers on p processors ($O_i^p$). To incrementally fill-up this table, the following approach is taken, using equation (2):

```
for i in range (m−1): // layers
    for j in range (i+1, m): // processor
        for k in range (1, i−1): // subsequence
            temporary_cost = O[i][j] // equation (2)
            if cost [i][j] > temporary_cost:
                cost [i][j] = temporary_cost
                partition_point [i][j] = k
```

However, it is not possible to leverage the partitioning techniques described above when distributed inference involves other processing element types (e.g., second processing element type such as COTS AI accelerators, FPGAs, and the like). Most of these devices perform some weight quantization on the trained model, resulting in accuracy drop. More specifically, in case, when (i) a $p^{th}$ processing element from the k processing elements is a second processing element type, (ii) the one or more compression configurations and the one or more quantization configurations are unavailable and (iii) training data is available for re-training of the obtained DL model, the step of generating compression configurations and quantization configurations comprises: freezing and converting a $p^{th}$ subsequence of transformed layers from k subsequences of transformed layers for executing in a $p^{th}$ processing element serving as the second PE type; re-training remaining transformed layers of the DL model without training the $p^{th}$ subsequence of transformed layers deployed on the $p^{th}$ processing element serving as the second PE type, wherein the remaining transformed layers of the DL model are retrained using an intermediate output of (i) a preceding subsequence of the $p^{th}$ subsequence of transformed layers (e.g., $o^{th}$ subsequence of transformed layers) and (ii) a next subsequence of the $p^{th}$ subsequence of transformed layers (e.g., $q^{th}$ subsequence of transformed layers); determining a partition point between the $p^{th}$ subsequence of transformed layers and the next subsequence of transformed layers; and modifying an index of layers in the obtained mapping based on the determined partition point between the $p^{th}$ subsequence of transformed layers and the next subsequence of transformed layers.

To address this and find an accuracy latency trade-off, embodiments of the present disclosure implement a Quantization Aware training (QAR) approach given in algorithm 2, referring to step 206. The algorithm 2/pseudo code: Quantization aware re-training (QAR) is provided below by way of example.

```
Result: Set of partition configurations
  1. i, start ← first layer;
  2. end ← last layer;
  3. while i ≤ end do
  4.   Freeze+convert layers 0 to i for HW Accelerator;
  5.   Re-train rest of the model from layers i;
  6.   ACC, LAT ← run inference on combined model;
  7.   solution_set_i ← {ACC, LAT};
  8.   i=i+1
  9. end
```

The above algorithms 1 and 2 are implemented using a software development kit (SDK) on corresponding systems/embedded devices depending on the requirement(s), in one embodiment of the present disclosure. In other words, the system 100 is configured/installed with a native/proprietary SDK software and then the algorithms/pseudo code 1 and 2 are executed to determine the one or more compression configurations and the one or more quantization configurations (refer 204 step) and the index of transformed layers in the obtained mapping is accordingly modified based on the determined partition point between the $p^{th}$ subsequence of transformed layers and the next subsequence of transformed layers (e.g., refer step 'continually partitioning subsequent subsequence of transformed layers into two partitions, each of the two partitions comprises a set of layers and assigning a first set of transformed layers from the set of layers to an earlier processing element and the second set of layers from the set of layers to a current processing element to obtain a mapping of k subsequences of transformed layers on the k processing elements'). In other words, corresponding set of layers from one partition are assigned to an earlier processing element and corresponding set of layers from another partition are assigned to a current processing element. More specifically, the modification in the index of transformed layers in the obtained mapping of the k subsequences of transformed layers on the k processing elements results in obtaining compression and quantization configurations, respectively.

At step 210 of the present disclosure, the one or more hardware processors 104 generate a DL model based on the mapped k subsequences of transformed layers on the k processing elements. In other words, once the mapping of k subsequences of transformed layers on the k processing elements is obtained, a DL model is generated based on the mapped k subsequences of transformed layers on the k processing elements. Further, the cascaded DL model inference program is implemented by the system 100 to execute the generated DL model and an overall inference accuracy, an overall inference latency, and an overall inference power consumption are determined (212). The system 100 (or the one or more hardware processors 104) implement a re-inforcement learning (RL) technique (comprised in the memory 102), wherein a sequence learning network is either rewarded or penalized (214) by the RL technique based on a comparison of the overall inference accuracy, the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers. The reward is provided to the sequence learning network if there is an optimal assignment of k subsequences of transformed layers on k processing elements, in one embodiment. A penalty is assigned to the sequence learning network if there is absence or lack in optimal assignment of k subsequences of transformed layers on k processing elements. This iterative process as described above ensures that k−1 subsequence of transformed layers is optimally assigned k−1 processing element.

The above steps of generating and executing the DL model and rewarding or penalizing the sequence learning network (e.g., the steps 210 through 214) are better understood by way of following description which illustrates a combined compression, quantization and partitioning method. Despite using the techniques presented/described above, a larger DL based workflow, may still not fit into the underlying hardware. To address such constraints, both compression and partitioning need to be incorporated. The compression approach as implemented by the present disclosure is a black-box function approximation of Deep Neural Network (DNN) representation as a piece-wise linear function. Training data is clustered with the assumption of similarly distributed training data can be appropriately grouped together and subsequently, a linear regression model is constructed for each of the clusters from the input (training data)-output (from corresponding baseline DNN representation before the final layer, e.g., softmax layer) relationship. If $X_c$, consists of all the training data belonging to cluster c, the weights $A_c$ of the linear regression model for the corresponding cluster or piece can be determined using equation (3) or its regularized variants.

$$\min_{A_c} \|Y_c - A_c X_c\|_F \quad (3)$$

During the inference stage, for a new data instance $x_{test}$, a cluster is first identified to which $x_{test}$ belongs and then the corresponding regression model is applied to obtain $y_{test}$. The last layer of the DNN model is then applied to $y_{test}$ to produce the final output $z_{test}$. The approach as described by the present disclosure provides the required control to make a trade-off between the accuracy and the model compression factor (λ) by choosing the number of clusters. Similar handles are also exposed from the partitioning technique. However, to find an optimal deployment configuration, it is required to choose different options from compressed, quantized, and partitioned parts of the model, satisfying application and hardware constraints. To find such an optimal composition reinforcement learning (RL) based approach is implemented in neural network search and further extended by including the hardware and workload often used in specific application scenarios such as cyber physical systems (CPS) as follows:

For a model m, let the transforms PART(m) and COMP(M) generate a set of n partitioned or models $\hat{m}_1, \hat{m}_2, \ldots, \hat{m}_n$. For each $\hat{m}_l$ for layer l, there are a set of k profiles $mc_1^l$, $mc_2^l, \ldots, mc_k^l$ for layer l with different accuracy-latency trade-offs to choose from. In a cascaded inference setting, the bottleneck accuracy ACC(M) is the minimum of all the individual components and can be defined as:

$$\hat{m}_l = \min_{i=1,2,\ldots,k}(ACC(mc_i^l)) \quad (4)$$

$$ACC(m) = \min_{i=1,2,\ldots,m}(\hat{m}_i) \quad (5)$$

Similarly, the upper bound of the IL can be defined as:

$$\hat{m}_l = \max_{i=1,2,\ldots,k}(LAT(mc_i^l)) \quad (6)$$

$$LAT(m) = \sum_{i=1,2,\ldots,m}(\hat{m}_i) \quad (7)$$

Based on the above two model, that represent the ensemble hardware configuration for a CPS system, the objective function can be defined as:

$$\underset{m}{\text{maximize }} ACC(m) \times [IPS(m)]^w \qquad (8)$$

where IPS(m) is the frames/second metric, inverse of LAT(m) and weight w derived empirically. This objective can be now maximized using an reinforcement learning (RL) approach (e.g., RL technique as known in the art). The RL based optimized searches for a list of configurations $c_{1:T}$ from the RL agent based on its internal parameters.

$$J = E_{P(c_{1:T}, \theta)}[R(m)] \qquad (9)$$

where m is a composite model generated by actions $c_{1:T}$, and R(m) is the objective value defined by equation (8).

Figure 5A:
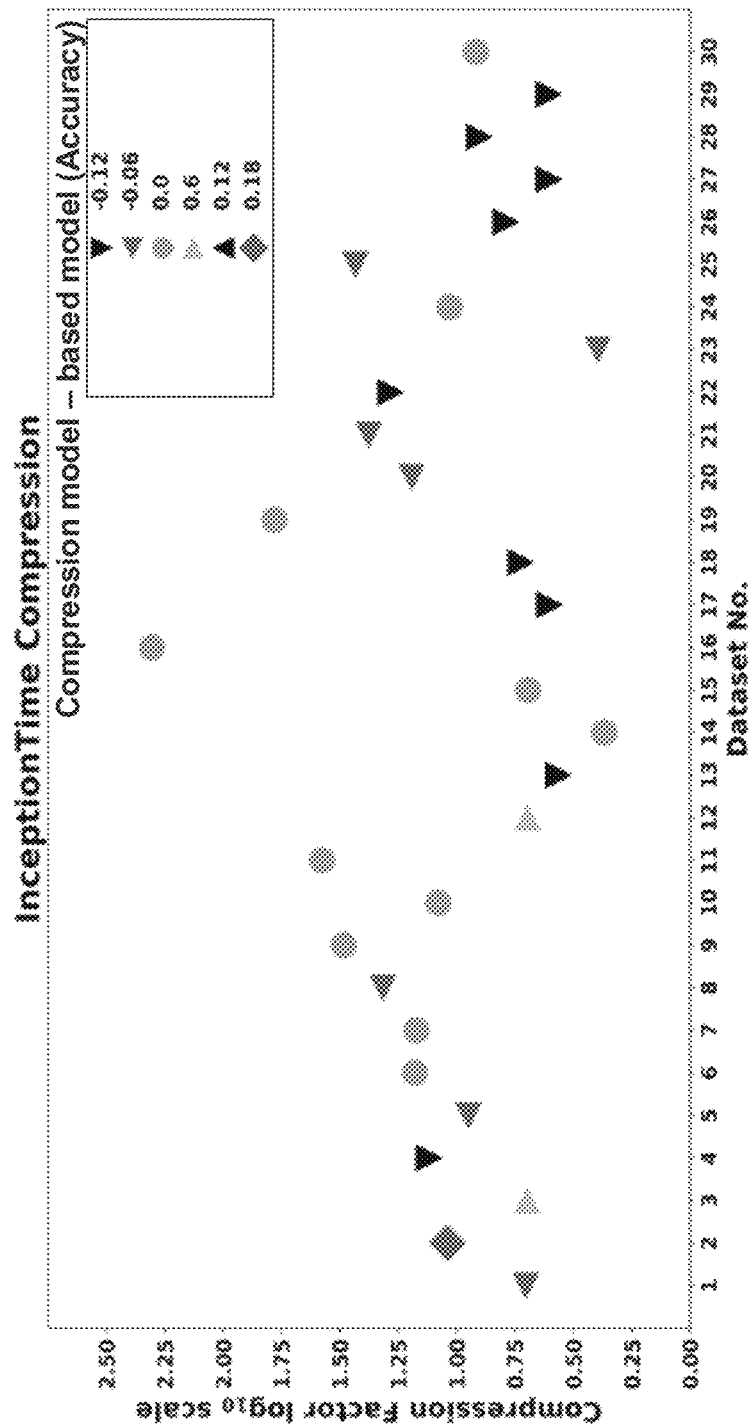
FIGS. 5A and 5B depict results from a compression technique as implemented by the system of FIG. 1, in accordance with an embodiment of the present disclosure.
Figure 5B:
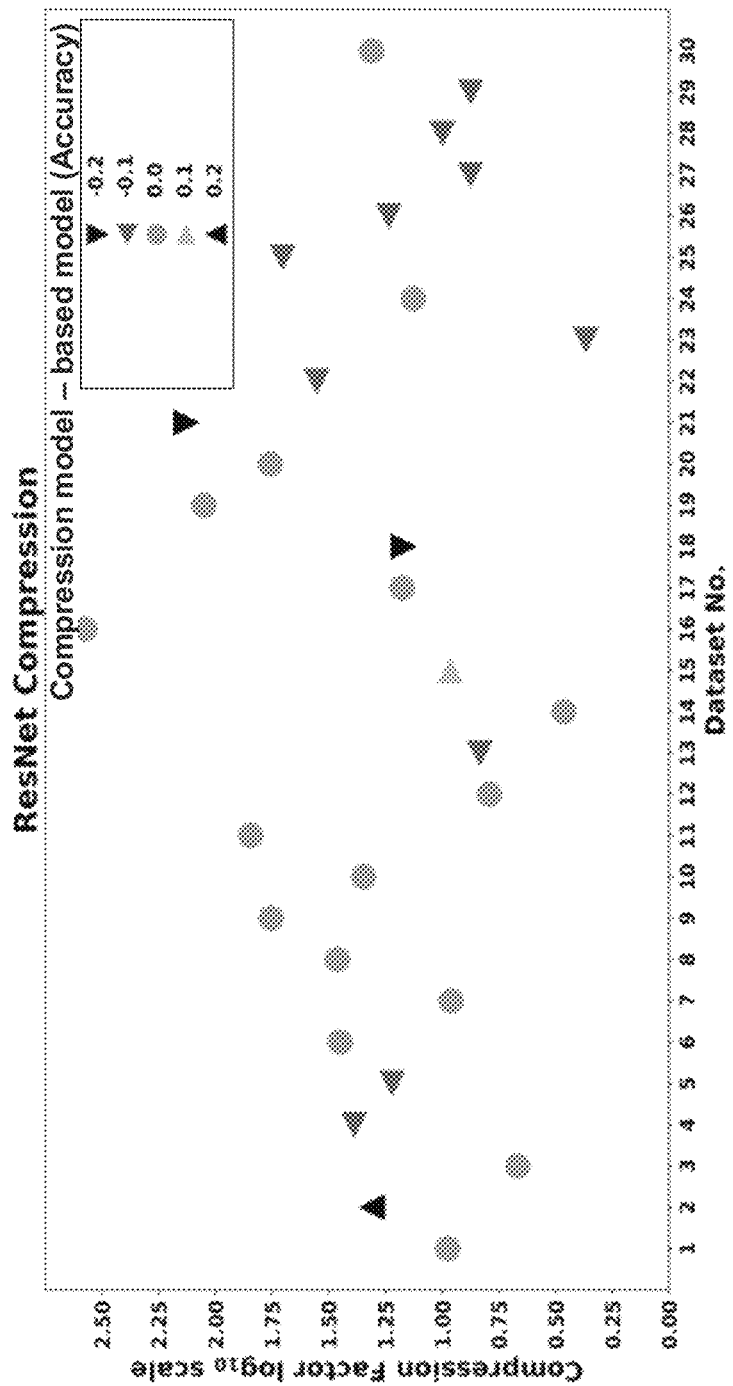
Figure 6:
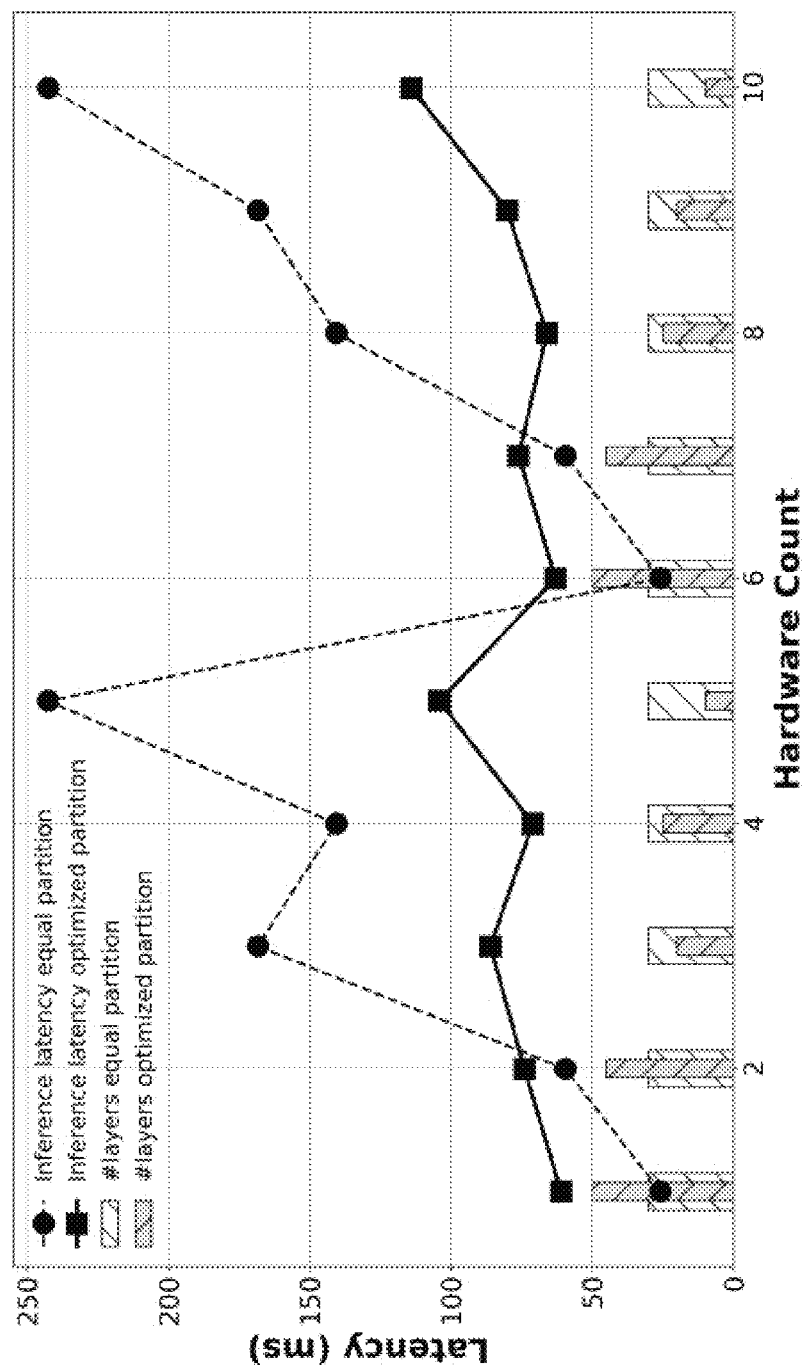
FIG. 6 depicts results from a partition technique as implemented by the system of FIG. 1, in accordance with an embodiment of the present disclosure.

In FIG. 3, the deployment is only needed if QAR (Algorithm 2) is used, otherwise ACC and LAT are simply linear combinations from configurations. Once the loop(s) is/are terminated by the system 100, accordingly the generated DL model is identified as a final DL model based on the mapped k subsequences of transformed layers on the k processing elements for the application scenario, at step 216. Results:

The search approach as described above, relies on the compression and partitioning components to get a set of profiles with different accuracy-latency trade-off. FIGS. 5A and 5B depict results from a compression technique as implemented by the system 100 of FIG. 1, in accordance with an embodiment of the present disclosure. More specifically, FIGS. 5A and 5B depict InceptionTime compression and ResNet compression results, respectively. The compression technique exposes accuracy-latency trade-off. FIG. 6 depicts results from a partition technique as implemented by the system 100 of FIG. 1, in accordance with an embodiment of the present disclosure. As a preliminary experiment, the RL based model composition was applied on fire detection and localization model comprising of a MobileNet classifier and Single Shot Multibox (SSD) localizer on a drone-mounted NVIDIA Jetson Nano board and Neural Compute Stick (NCS). For 52 layers of the composite model, there were five different choices for compression and five different partition choices between Jetson and NCS. A controller model was used with 2 GRU layers having 20 hidden units each. For QAR, each sampled architecture is validated on a test dataset through cascaded inference on Jetson Nano connected to a workstation, and NCS connected to the Jetson to get accuracy and latency. These values are used to obtain the reward function (refer equation (8)) as shown above. The whole workflow required less than an hour with no QAR, around 100 hours with QAR, with betterment of accuracy and latency over the handcrafted model that required two man-months.

Embodiments of the present disclosure address the problem of automatically transforming an already trained DL model to ensemble embedded systems. Through experiments, it is observed that the method of the present disclosure works where ground truth data is not available for re-training the model. Different configurations with varying accuracy-latency trade-off were used from compression and partitioning components to stitch an optimally composed model, for a given hardware setting. More specifically, the present disclosure describes an approach of combining different model transformation techniques to achieve an optimally composed model and modeling embedded targets (e.g., embedded devices/systems) into an RL based optimization framework.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media It is intended that the disclosure and examples be considered as exemplary only, with a true scope and spirit of disclosed embodiments being indicated by the following claims.

What is claimed is:

1. A processor implemented method, comprising:
  obtaining, via one or more hardware processors, a deep learning (DL) model and partitioning the DL model into a plurality of layers;
  partitioning, via the one or more hardware processors, the plurality of layers into k subsequences of layers based on k processing elements, wherein the k processing elements (PE) comprise a first processing element type;
  generating, for each layer in the plurality of layers of the DL model, via the one or more hardware processors, a transformed layer based on a selection of one or more compression configurations and one or more quantization configurations, wherein each of the one or more compression configurations and the one or more quantization configurations comprise a corresponding inference accuracy, a corresponding inference latency, and an inference power consumption, and wherein the corresponding inference accuracy, the corresponding inference latency, and the inference power consumption are obtained by executing a cascaded DL model inference program, wherein the one or more compression configurations and the one or more quantization configurations are either pre-defined or dynamically generated by respective compression and quantization units, wherein the one or more compression configurations and the one or more quantization configurations are generated based on a first scenario that includes a first processing element (PE) type and a second scenario that includes a second processing element (PE) type, wherein the first PE type and the second PE type are distinct from each other,
  wherein when (i) a $p^{th}$ processing element from k processing elements is the second PE type and (ii) the one or more compression configurations and the one or more quantization configurations are unavailable, the one or more compression configurations and the one or more quantization configurations are generated by:
    freezing and converting a $p^{th}$ subsequence of transformed layers from k subsequences of transformed layers for executing in a $p^{th}$ processing element serving as the second PE type;
    determining an inference accuracy, an inference latency, and an inference power consumption for the $p^{th}$ subsequence transformed layers on $p^{th}$ PE, at run-time based on (i) an intermediate output from a preceding subsequence of transformed layers and (ii) an intermediate output to a next subsequence of transformed layers; and
    generating the one or more quantization configurations and the one or more compression configurations based on the determined inference accuracy, the inference latency, and the inference power consumption for the $p^{th}$ subsequence of transformed layers;
  iteratively selecting, via the one or more hardware processors, at least one compression configuration and at least one quantization configuration for each of the transformed layers of the k subsequences of transformed layers, until each of the corresponding inference accuracy, the corresponding inference latency, and the inference power consumption reach a corresponding predefined threshold by:
    iteratively performing:
      assigning, via the one or more hardware processors, a first subsequence of transformed layers from the k subsequence of transformed layers to the first PE such that the first subsequences of transformed layers has a maximum inference accuracy, a minimum inference latency and a minimum power consumption on the first PE;
      partitioning, via the one or more hardware processors, a second subsequence of transformed layers from the k subsequences of transformed layers into a first set of transformed layers and a second set of transformed layers, and assigning the first set of transformed layers to the first PE and the second set of layers to the second PE, such that each of the first set of transformed layers and the second set of transformed layers has the maximum inference accuracy, the minimum inference latency and the minimum power consumption on the first PE and the second PE respectively, wherein the step of iteratively assigning and partitioning are performed to obtain a mapping of the first subsequence of transformed layers and the second subsequence of layers on the first PE and the second PE;
      partitioning, via the one or more hardware processors, the second subsequence of transformed layers of the DL model into two different partitions comprising of a set of transformed layers, and assigning the set of transformed layers from the two different partitions to the first PE and the second PE respectively, such that the second subsequences of layers has the maximum inference accuracy and the minimum inference latency, and the minimum power consumption on the first PE and the second PE; and
      continually partitioning, via the one or more hardware processors, subsequent subsequence of transformed layers into two partitions, each of the two partitions comprises a set of transformed layers, and assigning the set of transformed layers to an earlier processing element and a current processing element respectively, to obtain a mapping of k subsequences of transformed layers on the k processing elements, until the k subsequences of transformed layers have a maximum inference accuracy, a minimum inference latency and a minimum power consumption on the k processing elements (PE), wherein modification in index of the set of the transformed layers aids in obtaining the compression configurations and the quantization configurations;

generating, via the one or more hardware processors, a DL model based on the mapped k subsequences of transformed layers on the k processing elements;

executing, via the cascaded DL model inference program executed by the one or more hardware processors, the DL model and determining an overall inference accuracy and an overall inference latency, and an overall inference power consumption;

rewarding or penalizing, via the one or more hardware processors, by implementing a re-inforcement learning (RL) technique, a sequence learning network based on a comparison of the overall inference accuracy and the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers, wherein a reward is provided to the sequence learning network if there is an optimal assignment of k subsequences of the set of transformed layers on the k processing elements and wherein a penalty is assigned to the sequence learning network if there is a lack in the optimal assignment of k subsequences of the set of transformed layers on the k processing elements; and identifying, the generated DL model as a final DL model based on the mapped k subsequences of transformed layers on the k processing elements for the scenario.

2. The processor implemented method of claim 1, wherein when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by:

freezing and converting a $p^{th}$ subsequence of transformed layers from k subsequences of transformed layers for executing in a $p^{th}$ processing element serving as the second PE type;

re-training remaining transformed layers of the DL model without training the $p^{th}$ subsequence of transformed layers deployed on the $p^{th}$ processing element serving as the second PE type, wherein the remaining transformed layers of the DL model are retrained using an intermediate output of (i) a preceding subsequence of transformed layers of the $p^{th}$ subsequence of transformed layers and (ii) a next subsequence of transformed layers of the $p^{th}$ subsequence of transformed layers;

determining a partition point between the $p^{th}$ subsequence of transformed layers and the next subsequence of transformed layers; and modifying an index of transformed layers in the obtained mapping based on the determined partition point between the $p^{th}$ subsequence of transformed layers and the next subsequence of transformed layers.

3. A system, comprising:
a memory storing instructions;
one or more communication interfaces; and
one or more hardware processors coupled to the memory via the one or more communication interfaces, wherein the one or more hardware processors are configured by the instructions to:

obtain a deep learning (DL) model and partition the DL model into a plurality of layers;

partition the plurality of layers into k subsequences of layers based on k processing elements, wherein the k processing elements (PE) comprise a first processing element type;

generate, for each layer in the plurality of layers of the DL model, a transformed layer based on a one or more compression configurations and one or more quantization configurations, each of the one or more compression configurations and the one or more quantization configurations comprise a corresponding inference accuracy, a corresponding inference latency, and a inference power consumption, and wherein the corresponding inference accuracy, the corresponding inference latency, and the inference power consumption are obtained by executing a cascaded DL model inference program, wherein the one or more compression configurations and the one or more quantization configurations are either pre-defined or dynamically generated by respective compression and quantization units, wherein the one or more compression configurations and the one or more quantization configurations are generated based on a first scenario that includes a first processing element (PE) type and a second scenario that includes a second processing element (PE) type, wherein the first PE type and the second PE type are distinct from each other, wherein when (i) a $p^{th}$ processing element from k processing elements is the second PE type and (ii) the one or more compression configurations and the one or more quantization configurations are unavailable, the one or more compression configurations and the one or more quantization configurations are generated by:

freezing and converting a $p^{th}$ subsequence of transformed layers from k subsequences of transformed layers for executing in a $p^{th}$ processing element serving as the second PE type;

determining an inference accuracy, an inference latency, and an inference power consumption for the $p^{th}$ subsequence transformed layers on $p^{th}$ PE, at run-time based on (i) an intermediate output from a preceding subsequence of transformed layers and (ii) an intermediate output to a next subsequence of transformed layers; and generating the one or more quantization configurations and the one or more compression configurations based on the determined inference accuracy, the inference latency, and the inference power consumption for the $p^{th}$ subsequence of transformed layers;

iteratively select at least one compression configuration and at least one quantization configuration for each of the transformed layers of the k subsequences of transformed layers, until each of the corresponding inference accuracy, the corresponding inference latency, and the inference power consumption reach a corresponding predefined threshold by:
iteratively performing:
assigning, via the one or more hardware processors, a first subsequence of transformed layers from the k subsequences of transformed layers to the first PE such that the first subsequences of transformed layers has a maximum inference accuracy, a minimum inference latency and a minimum power consumption on the first PE;
partitioning, via the one or more hardware processors, a second subsequence of transformed layers from the k subsequences of transformed layers into a first set of transformed layers and a second set of transformed layers, and assigning the first set of transformed layers to the first PE and the second set of transformed layers to a second PE, such that each of the first subsequence of transformed layers and the second subsequences of transformed layers has the maximum inference accuracy, the minimum inference latency and the minimum power consumption on the first PE and the second PE respectively, wherein the step of iteratively assigning and splitting are performed to obtain a mapping of the first set of transformed layers and the second set of transformed layers on the first PE and the second PE;

partitioning, via the one or more hardware processors, the second subsequence of transformed layers of the DL model into two different partitions comprising of a set of transformed layers and assigning the set of transformed layers from the two different partitions to the first PE and the second PE respectively, such that the second subsequences of layers has the maximum inference accuracy and the minimum inference latency, and the minimum power consumption on the first PE and the second PE; and continually partitioning, via the one or more hardware processors, subsequent subsequence of transformed layers into two partitions, each of the two partitions comprises a set of transformed layers and assigning the set of layers from the two partitions to an earlier processing element and a current processing element respectively, to obtain a mapping of k subsequences of layers on the k processing elements, until the k subsequences of transformed layers have a maximum inference accuracy, a minimum inference latency and a minimum power consumption on the k processing elements (PE), wherein modification in index of the set of the transformed layers aids in obtaining the compression configurations and the quantization configurations;

generate a DL model based on the mapped k subsequences of layers on the k processing elements; executing, via a cascaded DL model inference program executed by the one or more hardware processors, the DL model and determining an overall inference accuracy and an overall inference latency, and an overall inference power consumption;

reward or penalize, via the one or more hardware processors, by implementing a reinforcement learning (RL) technique, a sequence learning network based on a comparison of the overall inference accuracy, the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers, wherein a reward is provided to the sequence learning network if there is an optimal assignment of k subsequences of the set of transformed layers on the k processing elements and wherein a penalty is assigned to the sequence learning network if there is a lack in the optimal assignment of k subsequences of the set of transformed layers on the k processing elements; and identify, the generated DL model as a final DL model based on the mapped k subsequences of transformed layers on the k processing elements for the application scenario.

4. The system of claim 3, wherein when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by:

freezing and converting a $p^{th}$ subsequence of transformed layers from k subsequences of transformed layers for executing in a $p^{th}$ processing element serving as the second PE type;

re-training remaining transformed layers of the DL model without training the $p^{th}$ subsequence of layers deployed on the $p^{th}$ processing element serving as the second PE type, wherein the remaining transformed layers of the DL model are retrained using an intermediate output of (i) a preceding subsequence of the $p^{th}$ subsequence of transformed layers and (ii) a next subsequence of the $p^{th}$ subsequence of transformed layers;

determining a partition point between the $p^{th}$ subsequence of transformed layers and the next subsequence of transformed layers; and modifying an index of layers in the obtained mapping based on the determined partition point between the $p^{th}$ subsequence of transformed layers and the next subsequence transformed layers.

5. One or more non-transitory machine readable information storage mediums comprising one or more instructions which when executed by one or more hardware processors causes a method, the method comprising:

obtaining a deep learning DL model and partitioning the DL model into a plurality of layers;

partitioning, via the one or more hardware processors, the plurality of layers into k subsequences of layers based on k processing elements, wherein the k processing elements (PE) comprise a first processing element type;

generating, for each layer of the DL model, a transformed layer based on a selection of one or more compression configurations and one or more quantization configurations, wherein each of the one or more compression configurations and the one or more quantization configurations comprise a corresponding inference accuracy, a corresponding inference latency, and a corresponding inference power consumption, wherein the corresponding inference accuracy, the corresponding inference latency, and the inference power consumption are obtained by executing a cascaded DL model inference program, wherein the one or more compression configurations and the one or more quantization configurations are either pre-defined or dynamically generated by respective compression and quantization units, wherein the one or more compression configurations and the one or more quantization configurations are generated based on a first scenario that includes a first processing element (PE) type and a second scenario that includes a second processing element (PE) type, wherein the first PE type and the second PE type are distinct from each other, wherein when (i) a pth processing element from k processing elements is the second PE type and (ii) the one or more compression configurations and the one or more quantization configurations are unavailable, the one or more compression configurations and the one or more quantization configurations are generated by:

freezing and converting a pth subsequence of transformed layers from k subsequences of transformed layers for executing in a pth processing element serving as the second PE type;

determining an inference accuracy, an inference latency, and an inference power consumption for the pth subsequence transformed layers on pth PE, at run-time based on (i) an intermediate output from a preceding subsequence of transformed layers and (ii) an intermediate output to a next subsequence of transformed layers; and generating the one or more quantization configurations and the one or more compression configurations based on the determined inference accuracy, the inference latency, and the inference power consumption for the pth subsequence of transformed layers;

iteratively selecting at least one compression configuration and at least one quantization configuration for each of the transformed layers of the k subsequences of transformed layers, until each of the corresponding inference accuracy, the corresponding inference latency, and the inference power consumption reach a corresponding predefined threshold by:

iteratively performing:

assigning a first subsequence of transformed layers from the k subsequences of transformed layers to a first processing element (PE) such that the first subsequence of transformed layers has a maximum inference accuracy and a minimum inference latency and a minimum power consumption on the first processing element (PE);

partitioning a second subsequence of transformed layers from the k subsequences of transformed layers into a first set of transformed layers and a second set of transformed layers and assigning the first set of transformed layers to the first PE and the second set of transformed layers to a second PE, such that each of the first subsequence of transformed layers and the second subsequence of transformed layers has the maximum inference accuracy, the minimum inference latency and the minimum power consumption on the first PE and the second PE respectively, wherein the steps of iteratively assigning and partitioning are performed to obtain a mapping of the first subsequence of transformed layers and the second subsequence of layers on the first PE and the second PE;

partitioning the second subsequence of transformed layers of the DL model into two different partitions comprising of a set of layers, assigning the corresponding set of layers from each of the two different partitions to the first PE and the second PE respectively, such that each of the first subsequence of transformed layers and the second subsequence of transformed layers has a maximum inference accuracy, a minimum inference latency and a minimum power consumption on the first PE and the second PE; and continually partitioning subsequent subsequence of layers into two partitions, each of the two partitions comprises a set of layers, and assigning a first set of layers from the set of layers to an earlier processing element and a second set of layers from the set of layers to a current processing element to obtain a mapping of k subsequences of layers on the k processing elements, wherein modification in index of the set of the transformed layers aids in obtaining the compression configurations and the quantization configurations;

generating a DL model based on the mapped k subsequences of layers on the k processing elements;

executing, via a cascaded DL model inference program, the DL model and determining an overall inference accuracy, an overall inference latency, and an overall inference power consumption;

rewarding or penalizing by implementing a re-inforcement learning (RL) technique, a sequence learning network based on a comparison of the overall inference accuracy and the overall inference latency, and the overall inference power consumption of (i) a current iteration of the cascaded DL model inference program generated by a selection of sequence of transformed layers and (ii) a previous iteration of the cascaded DL model inference program generated by a selection of sequence of transformed layers, wherein a reward is provided to the sequence learning network if there is an optimal assignment of k subsequences of the set of transformed layers on the k processing elements and wherein a penalty is assigned to the sequence learning network if there is a lack in the optimal assignment of k subsequences of the set of transformed layers on the k processing elements; and identifying, the generated DL model as a final DL model based on the mapped k subsequences of transformed layers on the k processing elements for the application scenario.

6. The one or more non-transitory machine readable information storage mediums of claim 5, wherein when (i) a $p^{th}$ processing element from the k processing elements is a second processing element type, (ii) the one or more compression configurations and the one or more quantization configurations are unavailable and (iii) training data is available for re-training of the obtained DL model, the one or more compression configurations and the one or more quantization configurations are generated by:

freezing and converting a $p^{th}$ subsequence of transformed layers from k subsequences of transformed layers for executing in a $p^{th}$ processing element serving as the second PE type;

re-training remaining transformed layers of the DL model without training the $p^{th}$ subsequence of transformed layers deployed on the $p^{th}$ processing element serving as the second PE type, wherein the remaining transformed layers of the DL model are retrained using an intermediate output of (i) a preceding subsequence of transformed layers of the $p^{th}$ subsequence of transformed layers and (ii) a next subsequence of transformed layers of the $p^{th}$ subsequence of transformed layers;

determining a partition point between the $p^{th}$ subsequence of transformed layers and the next subsequence of transformed layers; and modifying an index of transformed layers in the obtained mapping based on the determined partition point between the $p^{th}$ subsequence of transformed layers and the next subsequence of transformed layers.

7. The method of claim 1, wherein the first PE type comprises processing elements such as embedded systems comprising a Neural Compute Stick, and the second PE type comprises processing elements such as commercial off-the-shelf (COTS) Artificial Intelligence (AI) accelerators (or Artificial Intelligence based hardware accelerators), one or more field-programmable gate arrays (FPGAs).

\* \* \* \* \*